June 19, 1934.  A. NAGELVOORT  1,963,921
EXTRACTING SULPHUR
Filed Jan. 7, 1933    3 Sheets-Sheet 2

Patented June 19, 1934

1,963,921

UNITED STATES PATENT OFFICE 1,963,921

EXTRACTING SULPHUR

Adriaan Nagelvoort, Wilmington, Del., assignor to Delaware Chemical Engineering Company, Wilmington, Del., a corporation of Delaware Application January 7, 1933, Serial No. 650,697

15 Claims. (Cl. 23—228)

This invention relates to extracting sulphur; and it comprises a method of safely leaching sulphur ores with liquid carbon disulphid wherein upper surfaces of the liquid body are protected against evaporation and sealed in by a floating layer of water, the supply of ore to and removal of extracted residues from said body being effected through such a liquid seal; and it also comprises a method of and means for extracting and recovering sulphur from its ores wherein ore is extracted with liquid $CS_2$ and the sulphur solution evaporated under reduced pressure, the vapors being repressured and returned to the extracting means; and it further comprises as an improvement in sulphur extracting apparatus a closed and sealed system comprising a crystallizing chamber and a leaching chamber with connections to permit cyclic circulation of carbon disulphid therebetween, said leaching means being provided with means for feeding ore thereto and removing solid residue therefrom through water layers, said layers effecting the sealing at these points; and it still further comprises various specific improvements in said method and said apparatus; all as more fully hereinafter set forth and as claimed.

Free sulphur is widely distributed in nature and occurs as extensive deposits, both in this country and abroad. The sulphur is rarely in a pure state; being usually what may be called a sulphur ore; a more or less indefinite mixture of sulphur and earthy or rocky gangue. Abroad, these deposits are exploited as a source of commercial sulphur; but the American deposits are mostly neglected. Generally, recovery is by the rather primitive method of burning some of the sulphur to melt or vaporize the rest. The Sicilian method of making flowers of sulphur by leading vapors so produced into cold chambers is much used abroad. These semi-combustion methods are wasteful and burden the air with fumes of sulphur dioxid; but they are cheap and effective. No better commercial method has come into use.

Sporadic attempts have been made to apply to sulphur ore the extraction and leaching methods and apparatus used with other materials; but without commercial success. Curiously enough, the best known solvent for sulphur, carbon disulphid, has been seldom contemplated although a variety of other solvents have been tried; among them a mixture of xylene and acetylene tetrachlorid, toluene, a mixture of toluene and carbon tetrachlorid, light tar oils, light petroleum oils, etc. None of these liquids has justified its use. They are all, as a matter of fact rather poor solvents for sulphur; they must be used at rather high temperatures and they do not deliver sulphur free of impurities.

Carbon disulphid was at one time largely used in extracting fats and oils, and especially linseed oil; but it is not now in favor as an extracting solvent for factory work, being regarded as unsafe. There is no doubt that this is true so far as it concerns commercial steam heated types of extractors or processes involving heat and pressure. The boiling point of $CS_2$ is quite low, being about 46° C. and its vapors are easily inflammable, taking fire at a lower temperature than any other common material. Ignition normally occurs around 150° C., but hot iron at lower temperatures, such as a steam pipe, may start combustion. It is, furthermore, difficult to confine the vapors under any pressure as they readily penetrate the usual gasketing materials. Safer and more convenient solvents are available for extracting fats and oils; and the use of $CS_2$ is, as stated, not now favored for any extracting purpose.

I have however found that in spite of the disfavor in which carbon disulphid is held as an extracting solvent, it is feasible to use it in extracting sulphur from its ores on a commercial scale with complete safety; and not only with safety but with entirely satisfactory results as regards efficiency and economy as well as smoothness and rapidity of operation. These objects are accomplished by taking due advantage of the peculiar characteristics of $CS_2$. Safety is secured by operating in a closed and sealed system at or about atmospheric temperature and pressure; convenience by using water seals at points where solids enter and leave the system; and high capacity by using rapid cyclic circulation of contained $CS_2$ between an extracting chamber and a crystallizing chamber. In the extraction, temperatures and pressures around atmospheric are ordinarily employed but in the crystallizing chamber local sub-atmospheric temperatures and pressures, either or both, may be, and frequently are, employed. In one embodiment of this invention the system is, so to speak, adiabatic; balancing degrees of heat and cold occurring on the two sides of a pump and both originating with the pump. Such a system, and others possible under this invention, can be made compact and self-contained, requiring nothing but power and ore to deliver commercial sulphur and clean waste; and could be, if it were worth while, operated efficiently when entirely submerged in a tank of water.

In recovering sulphur from ore with carbon disulphid under the present invention operating costs are low, and particularly as regards labor. There is little consumption of fuel or power and little loss of disulphid in a properly designed plant; the same charge of disulphid being used indefinitely long and in the extraction of indefinitely large amounts of clean sulphur needing no further refining. The present invention renders commercially available as sources of sulphur large deposits of ore not now utilized. It may also be used with various artificial materials containing free sulphur such as the spent iron oxid used in purifying gas; and is applicable to purifying crude sulphur obtained in various sulphur recovery processes. All these materials containing free sulphur in admixture with impurities for the sake of brevity, may be here called sulphur ore.

A complete self-ontained plant under the present invention receiving sulphur ore and delivering clean sulphur and clean waste may be regarded as composed of two main cooperating parts or elements: a leacher or extractor in which ore is washed with carbon disulphid and a crystallizing chamber in which sulphur is separated from the carbon disulphid, enabling reuse of the latter in the leacher. Both elements must be sealed against escape of disulphid vapors; for the sake of economy as well as of safety. Welded joints are used wherever possible. Packing and gasketing containing grease and greasy lubricants should be avoided, wet material and aqueous lubricants being used in their lieu. Sealing is not as easy with the leacher as it is with the crystallizer since provision must be made for charging with granular ore as well as for discharge of solid waste. With the crystallizer under sub-atmospheric pressure outward leakage of vapors becomes impossible.

The use of leaching or extracting apparatus of almost any type however becomes practicable by the expedient of using liquid seals; floating water layers resting on the upper surfaces of contained bodies of carbon disulphid. Water and carbon disulphid are wholly immiscible while the former is much lighter than the latter. Such a layer of floating water forms a complete liquid cover shielding a body of disulphid against contact with air and ready evaporation. Ore can be charged down through such a seal into the body of disulphid and waste can be removed upwardly through water. Because of the great difference in specific gravity between water and disulphid there is little tendency for liquid from either layer to pass into the other entrained in the passing granulated ore or waste. Displacement of each liquid by the other is ready. It is interesting to note that the preliminary wetting of the ore by water does not interfere with the extraction of sulphur by disulphid but rather aids it. Water wets gangue minerals preferentially while the reverse is true of the disulphid. Sulphur is substantially unwetted by water.

An incidental but substantial advantage of this mode of charging is that it obviates direct displacement of air in the dry charge by liquid $CS_2$ and, similarly, $CS_2$ is removed from the waste prior to contact with air.

While as stated a variety of types of leaching apparatus are applicable, I regard it as the best practice to use countercurrent principles and continuous operation. A simple and convenient type of apparatus is an arcuate tubular conveyor casing with the ends up. A pool of disulphid can be established and maintained in the low point, sealed in by water layers at each end. With the conveyor in operation, granulated ore is taken through a water layer, thence through the disulphid layer and finally out through another water layer. Another useful apparatus is an inclined cylinder with a conveyor along the bottom. With a charge of disulphid as a pool at the low end and a covering layer of water, ore can be fed into the pool and thence out to the high end of the casing without exposure of the surface of the disulphid. With either apparatus, sulphur solution is removed from the pool, continuously or discontinuously as the case may be, and replaced by fresh solvent. Sulphur is recovered from the solution and $CS_2$ sent back to the pool.

Instead of moving the ore relative to the liquid as just described it is practicable to do the opposite; to pass a stream of solvent in methodical and well understood ways through a series of stationary ore bodies, using apparatus analogous to an ordinary diffusion battery. But this mode of operation while presenting a number of advantages in large scale plants requires a multiplicity of pumps, pipes and valves to be kept tight against carbon disulphid.

The solvent power of carbon disulphid for sulphur at the ordinary temperature is large; but even concentrated solutions are thinly mobile, being easily pumped, piped and handled. The thinly liquid nature of these solutions much facilitates work in the leacher. A saturated solution boiling at 56° carries at that temperature about 66 per cent sulphur; 100 parts of disulphid dissolving 180 parts of sulphur. This solution is still mobile. I do not however ordinarily contemplate using solutions of this strength or temperatures as high as 56°; although both are practicable. Solutions completely saturated at any temperature above atmospheric are apt to cause plugging difficulties in pipe lines if their temperature be allowed to drop. Temperatures in the leacher as high as 60° C. are permissible; but any temperature approaching or above 46°, the boiling point of disulphid under atmospheric pressure, requires special precautions and the use of plus pressure which is not always convenient. Ebullition of the bisulphid below the water seal is not permissible; and azeotropic vapor mixtures may form somewhat below 46°. On the whole, it is better to keep temperatures in the leacher around 40° C.

At 40° C. a saturated solution of sulphur carries about 58 per cent sulphur; 100 parts by weight of disulphid dissolving 137 parts by weight of sulphur. On chilling to about 0° the amount of dissolved sulphur becomes small; 100 parts of disulphid at 0° C. dissolving only 24 parts of sulphur.

In one embodiment of the present invention, liquid disulphid is circulated back and forth between the leacher and a chilled crystallizer; the chilled mother liquid separated from the crystals being rewarmed and going back to the leacher. This permits use of a simple type of apparatus since disulphid vapors are not formed at any time; but extraction is not as complete as where the disulphid is vaporized prior to its return to the leacher. However the amount of extraction which can be effected in this way is often economically sufficient.

Removal of the disulphid from the sulphur solutions as vapor and recondensation of liquid may be effected by ordinary distillation methods and apparatus; bearing in mind however that the maximum temperature of the boiling liquid is only about 56° and that the cooling water must cool the vapors well below 46° C. In summer artificial refrigeration is sometimes necessary.

In what I now regard however as the best embodiment of my invention warm sulphur solutions coming from the leacher are cooled and concentrated in the crystallizer by self-evaporation under pump suction. This gives a sort of adiabatic operation. Not much power is required to convert the vapors into warm liquid which can be directly returned to the leacher. The power is lessened and better operation secured by a heat exchange between the compressed vapors and the liquor on its way to the crystallizer; this facilitating liquefaction and giving more thermal units available for evaporation in the crystallizer. Or the hot repressured vapors may be used in furnishing thermal units to the crystallizer, being thereby cooled and liquefied.

By interposing a pump between the leacher and the crystallizer a pressure differential is created and with the leacher at atmospheric pressure the crystallizer is then under sub-atmospheric pressure.

In the crystallizer with a liquid undergoing self evaporation, separation of crystallized sulphur results both from the cooling and from evaporation.

An evaporative crystallizer can be run continuously or discontinuously; this depending on the type of apparatus used. In batch operation a sulphur solution can be boiled to grain and the grain built up to form a standard granular product. Or evaporation may be as fast as the feed, giving a meal of sulphur. When the accumulated sulphur is in sufficient amount, it is dumped but prior to breaking the vacuum I ordinarily introduce a little water vapor to carry forward residual $CS_2$. In continuous operation crystallized sulphur can be taken out by a conveyor and sent to exit through a water seal; but I usually pass the sulphur through a drying zone with a little countercurrent feed of water vapor.

The evaporative cooler may be provided with heating means served with circulating water at or near the ordinary temperature. Suction from the vapor pump may be used in recovering traces of disulphid adhering to discharged gangue and sulphur.

In the accompanying drawings I have shown rather diagrammatically, flow sheets representing the general operation under the present invention and some details of apparatus. In this showing, Fig. 1 is a flow sheet of an advantageous mode of operation;

Figure 1:
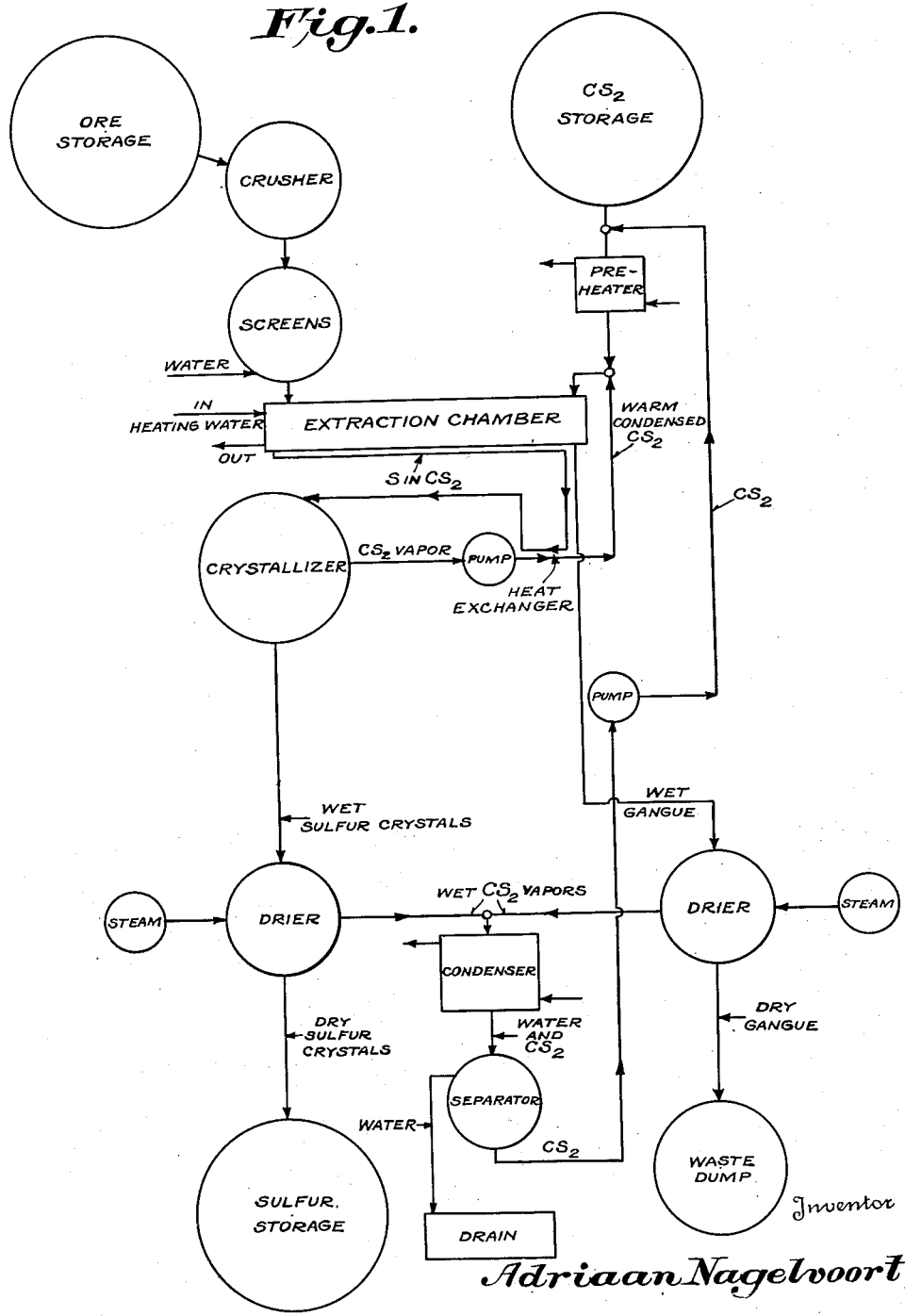
Figure 3:
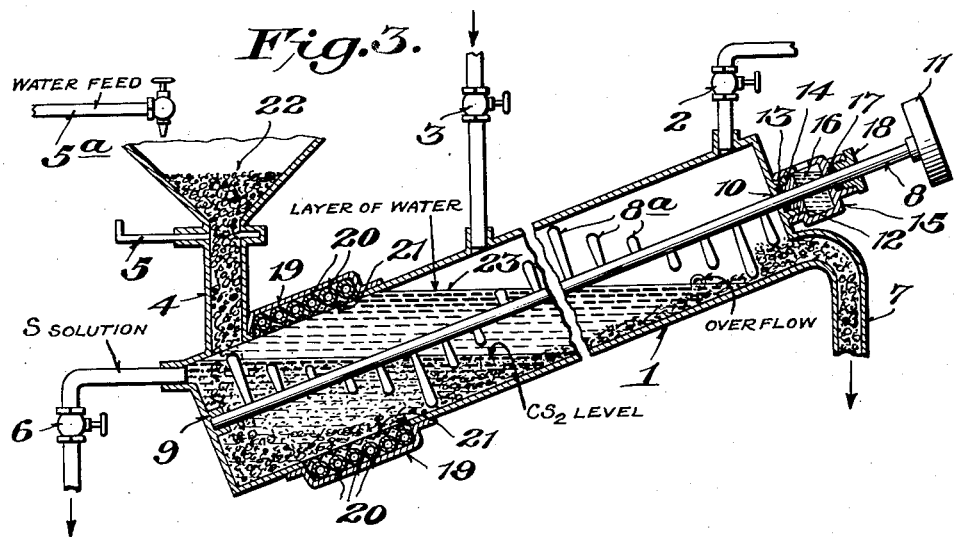
Fig. 3 is a central vertical section of an extraction apparatus.

In the flow sheet of Fig. 1, sulphur ore of any kind, which may be a western conglomerate rock carrying about 20 to 30 per cent of crystals of sulphur with a quartz gangue, is crushed, screened, wet with water and transferred to an extraction chamber, shown more in detail in Fig. 3. In the extraction chamber the ore is leached with carbon disulphid and the sulphur solution passes through suitable valved means into a crystallizer which may be an ordinary type vacuum pan with suction maintained by suitable wet packed pumping means. Vapors from the crystallizer are brought into heat exchange relation with the sulphur solution entering the crystallizer as shown. The solution undergoes self-evaporation, concentrates, cools and deposits crystals of sulphur. From the crystallizer sulphur crystals still carrying some adhering carbon disulphid go to a drier (shown more in detail in Fig. 4) having a slow feed of water vapor therethrough; this vapor being dry at the temperatures used. The water vapor carries forward carbon disulphid vapors. The dried sulphur crystals go to storage. Mixed vapors from the drier, containing both $CS_2$ and $H_2O$, pass through a condenser, giving a condensate separating into two layers. The upper aqueous layer is sent to waste through a drain while the carbon disulphid is pumped back to storage.

The wet extracted waste or gangue from the extraction chamber goes through a drier which is also provided with a slight feed of steam. Residual carbon disulphid is vaporized and as shown in Fig. 1 joins the mixed vapors which come from the drier for sulphur crystals. The dry gangue goes to waste.

Carbon disulphid is delivered to the extraction chamber from storage through a preheater adapted to give the liquid such a temperature as may be desired in the extraction chamber; ordinarily somewhere around 40° C. Heating is sometimes not necessary. The liquefied carbon disulphid vapors from the crystallizer are usually delivered sufficiently warm and require no preheating.

Figure 2:
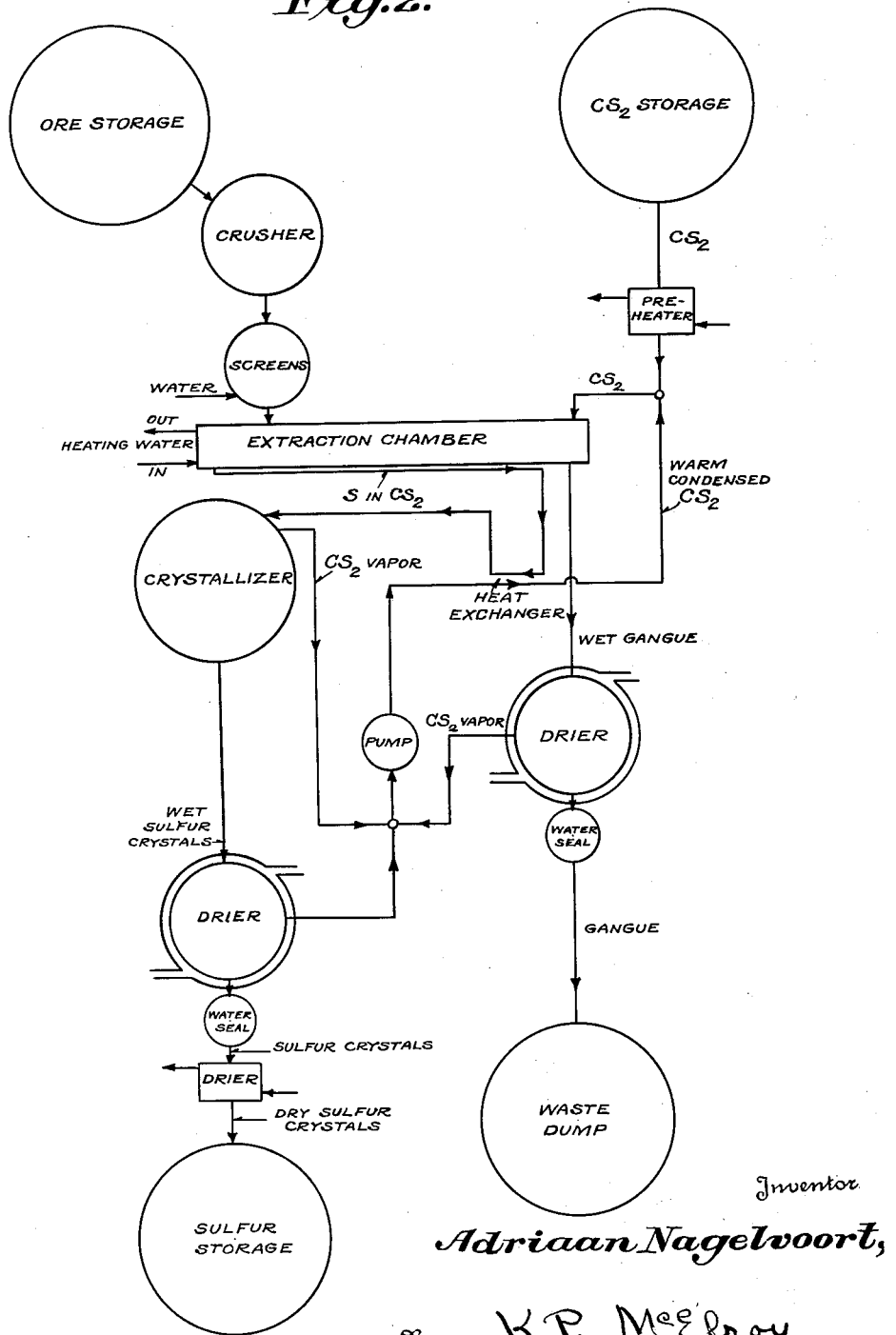
Fig. 2 is a flow sheet of a somewhat simplified operation.

In the flow sheet of Fig. 2, the operations of extracting ore and crystallizing sulphur from solution are generally similar to the operations just described. However, in Fig. 2 the sulphur crystals are shown as going to a different type of drier; a casing surrounded by a heating jacket and under pump suction. The crystals freed of carbon disulphid pass through a water seal to an ordinary drier adapted for removing water picked up in the seal. Sulphur crystals are not wetted by water and the amount of water carried forward is very little. The sulphur crystals go to storage. Wet gangue from the extracting means is indicated as going to a similar drier having a heating jacket and also under pump suction. Vaporized carbon disulphid joins the vapors coming from the sulphur drier and from the crystallizer. Vapors from the three sources are condensed on the compression side of the suction means and return to the extraction chamber. The dried gangue passes through a water seal to prevent entrance of air to the suction system. It finally goes to a waste pump.

Fig. 3 shows in detail an extraction chamber particularly adapted for use in the present process. In this showing, reference numeral 1 indicates a long cylindrical casing in inclined operating position; the inclination being sufficient to enable establishment and maintenance of a pool of disulphid in the low end extending part way up the inclined bottom. Surmounting this disulphid layer is a water layer extending further along the bottom but terminating somewhat short of the gangue outlet. The casing is provided with a liquid $CS_2$ inlet 3 near the middle and with an ore inlet 4 near the low end delivering into the $CS_2$ pool. The ore inlet 4 has an adjustable gate 5 and water supply 5a to assist in wetting the ore and displacing air. The water layer as shown extends upward in 4. A valved outlet 6 for sulphur solution is provided tapping the lower liquid. Outlet conduit 7 at the upper end is provided for leached material or gangue. A bladed conveyor having a shaft 8 centrally disposed within the casing carries a series of radially disposed blades 8A arranged as a discontinuous helix. Ore going through the water layer into the disulphid layer is agitated in the disulphid and carried forward into the water layer. Agitation of the granular material in the water displaces entrained drops of disulphid which drain down and back. Beyond the water layer the gangue mass is drained, the water flowing down and back. The shaft is supported at one end in inside bearing 9 at the low end of the casing and extends outward through opening 10 at the high end. It carries a pulley 11. To provide a water seal for the shaft, opening 10 is shown surrounded by a lipped portion 12 threaded on its inner and outer circumferences and is sealed by water wet packing 13, held in place by a packing gland 14 in threaded engagement with the inner circumference of lipped portion 12. A hollow box 15 threaded at one end to engage with the outer threading on lipped portion 11 surrounds the shaft 8 and is filled with water 16 thereby forming a water seal preventing escape of vapors. The water in turn is prevented from escaping at the upper end of the water seal by packing 17 and packing gland 18.

If the leacher is to operate at some fixed temperature, say 40° C., as is advisable, heating or cooling may be required. The necessity depends on air and water temperatures and on the temperature of returned $CS_2$. As shown the casing is provided near inlet 4 with an enlarged portion 19 extending around its circumference and containing coiled pipes 20 adapted to carry either a heating or a cooling medium. The coils are in direct contact with the liquids in the casing and are protected by a screen 21.

In operation, wet crushed ore 22 is fed in through 4, the rate of admission being controlled by adjustment of the gate 5. Simultaneously, $CS_2$ is admitted at the desired rate through valved inlet 3 giving a downward flow of $CS_2$ against the upwardly passing ore. The sulphur solution passes outward through valved outlet 6 to a crystallizer (not shown).

Valved outlet 2 establishes communication with the air space existing in the high end of the casing but has no necessary function during operation.

Figure 4:
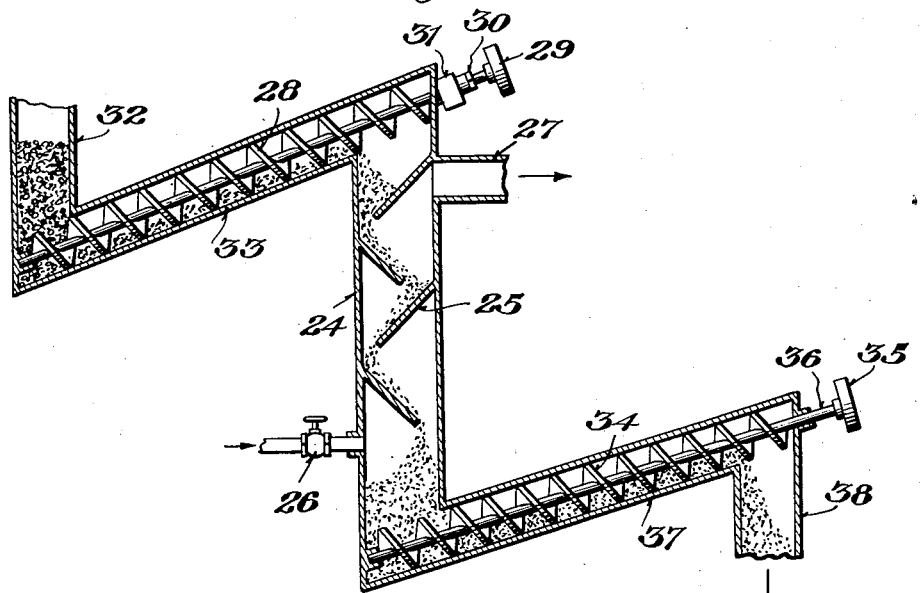
Fig. 4 is a similar view of a drier useful in removing $CS_2$ from wet gangue and from sulphur as shown in the flow sheet.

Fig. 4 shows a specific form of drying apparatus adapted for use for removing solvent adhering to either sulphur or waste gangue. In this showing reference numeral 24 indicates a vertical chamber provided from top to bottom with a series of downwardly inclined baffles 25 giving a tortuous path. Near the bottom of 24 a valved inlet 26 provides for bleeding dry steam into the chamber and an outlet 27 is provided at the top of the chamber for removal of vapors. The column of material in 32 and that in 34 permits slight suction to be applied through 27; sufficient to vaporize any $CS_2$ present. The material to be dried is fed in at the top of the container by a screw conveyor 28 driven by a pulley 29 and shaft 30. The entrance of the shaft to the chamber is sealed by a box 31, the parts and arrangement of which correspond to the box 15 described under Fig. 3. The screw conveyor carries the material from the base of an upright pipe 32, wherein the wet particles form a seal, up an inclined pipe 33 from which the material drops into the chamber 24. The dried material in the base of the chamber 24 is removed by means of another screw conveyor 34 driven by a pulley 35 and shaft 36. The screw conveyor 34 carries the dried material up an inclined pipe 37 from which it drops into an outlet 38.

In the structure shown in Fig. 3, the water has various important functions. In addition to serving as a seal or floating cover it displaces air from the ore prior to contact with the $CS_2$, and $CS_2$ from the extracted gangue. With the usual siliceous gangue its wetting action is preferential and the wet gangue has little tendency to take up or retain $CS_2$ even when the granules are quite porous; the wet gangue passing up through the water layer releases entrained $CS_2$. And the water acts as a temperature stabilizing means. With a large volume of water in cylinder 1, the system is little sensitive to fluctuations in temperature of the air or the ore.

What I claim is:—

1. In the extraction of sulphur from its ores the process which comprises establishing and maintaining a pool of liquid carbon disulphid with its upper surfaces sealed by floating water, supplying ore thereto downward through water, removing extracted ore upwards through water, removing sulphur solution from the pool, separating sulphur and carbon disulphid therefrom, and returning the disulphid to the pool.

2. The process of claim 1 wherein sulphur is separated by chilling and the chilled liquid is warmed and sent back to the pool.

3. The process of claim 1 wherein sulphur is separated from disulphid by evaporation of the latter, the vapors condensed to a liquid and the liquid returned to the pool.

4. The process of claim 1 wherein separation is effected by cooling and evaporating under suction, the vapors are condensed to liquid under pressure and the liquid returned to the pool.

5. In the extraction of sulphur from its ores by leaching with warm liquid carbon disulphid to dissolved out sulphur, the process of recovering the sulphur and the disulphid from the leach liquor which comprises cooling and concentrating the warm leach liquor by evaporation thereof under reduced pressure with exclusion of air to produce crystallized sulphur and carbon disulphid vapor, repressuring the vapor to condense it to warm liquid disulphid and returning the liquid to the leaching apparatus.

6. In the extraction of sulphur from its ores the process which comprises establishing and maintaining a pool of liquid carbon disulphid at the low end of a casing set at an angle and with an inclined bottom extending up beyond the level of said pool, establishing and maintaining a supernatant body of water in said casing extending over said bottom a substantial distance beyond the pool, supplying granulated ore to said pool through the overlying water and conveying extracted ore upward along said bottom out of said pool and through said body of water to a point of discharge.

7. In a self-contained power operated apparatus for extracting and recovering sulphur from its ores with the aid of carbon disulphid, the combination comprising an extracting chamber adapted to contain a pool of carbon disulphid and having means for supplying ore thereto and for withdrawing ore therefrom, a crystallizing chamber adapted to contain a body of sulphur solution, conduit means connecting the extracting chamber with the crystallizing chamber and adapted to supply a sulphur solution from the extracting chamber to the crystallizing chamber, a pump having the inlet connected to the crystallizing chamber and the outlet to the extracting chamber and adapted to maintain pressure and temperature differentials between the two chambers, said pump being adapted to remove disulphid from the crystallizing chamber and to transmit disulphid directly back to the pool in the extracting chamber, the apparatus being sealed at all points against access of air to the disulphid.

8. In a plant for extracting and recovering sulphur from its ores with a charge of carbon disulphid in cyclic circulation, a closed chamber, means for maintaining a pool of liquid disulphid in the chamber, means for establishing and maintaining a layer of water on the disulphid pool forming a seal, means for feeding ore into the pool through the seal, means for removing extracted ore through the seal, a closed crystallizing chamber adapted to contain a body of sulphur solution, conduit means connecting the extracting chamber with the crystallizing chamber and adapted to conduct solution from the extracting chamber to the crystallizing chamber, a pump connected with the crystallizing chamber and the extracting chamber and adapted to draw vapors of disulphid from the crystallizing chamber and return disulphid to the extracting chamber, and conduit means adapted to put removed exhausted ore and removed crystallized sulphur under suction, said conduit means being in communication with the inlet of the pump, so as to remove adhering carbon disulphid and return it to the extracting chamber, the apparatus being sealed at all points against access of air to the carbon disulphid.

9. In extracting sulphur from ores by leaching such ores with a body of liquid carbon disulphid, the process which comprises shielding said body of liquid against contact with air by establishing and maintaining a floating cover of water thereon, and removing leached ore upwardly through the water so as to allow any disulphid entrained in the leached ore to be displaced and expelled by the water.

10. In sulphur extracting apparatus a closed system sealed against access of air comprising a crystallizing chamber and a leaching chamber, means for introducing ore into, and for discharging extracted ore from the leaching chamber, and pump means for circulating a charge of carbon disulphid between said chambers cyclically, and a sealing layer of water in the leaching chamber at points of inlet and discharge of solid materials.

11. In sulphur extracting apparatus a closed system sealed against access of air comprising a crystallizing chamber and a leaching chamber, the leaching chamber being adapted to contain a pool of carbon disulphid, and pump means for circulating a charge of carbon disulphid between said chambers cyclically, means for establishing and maintaining a layer of water on the carbon disulphid pool, forming a seal, said system also comprising means for introducing ore to and removing waste from said leaching chamber through the water seal without disturbance of the circulation.

12. The apparatus of claim 11 provided with means for maintaining the leaching chamber at a predetermined temperature in the neighborhood of 40° C., said means including closed conduit means adjacent the leaching chamber and in heat exchanging relationship therewith and adapted to contain circulating temperature-adjusting fluids and also including a substantial body of water floating on and sealing in the carbon disulphid in the leaching chamber.

13. The process of extracting and recovering sulphur from its ores which comprises leaching such an ore in a suitable leaching apparatus with carbon disulphid at a temperature around 40° C. to form a sulphur solution, exposing the solution to evaporation at reduced pressure to produce crystallized sulphur and carbon disulphid vapors, repressuring the vapors and returning to the leaching apparatus at approximately 40° C., the carbon disulphid being protected from access of air during the process.

14. In a plant for extracting and recovering sulphur from its ores with the aid of carbon disulphid, an extracting chamber having means for introducing ore thereinto and means for removing extracted ore therefrom, means for establishing and maintaining a body of carbon disulphid in the extracting chamber, means for establishing and maintaining a water seal in the extracting chamber above the body of disulphid, a crystallizing chamber, means for withdrawing carbon disulphid from the extracting chamber and for introducing it into the crystallizing chamber, a pump adapted to remove disulphid vapors from the crystallizing chamber under suction and conduit means leading from the outlet side of the pump back to the extracting chamber for returning condensed disulphid vapors to the extraction chamber, the carbon disulphid being sealed from access of air at all points.

15. In extracting sulphur ores by means of carbon disulphid, the process which comprises establishing and maintaining a layer of water above the disulphid, and introducing the ore into the disulphid through this layer, whereby air in the ore is displaced by water, and then the water displaced by disulphid.

ADRIAAN NAGELVOORT.